(12) United States Patent
Chang

(10) Patent No.: US 8,381,998 B1  
(45) Date of Patent: Feb. 26, 2013

(54) METHOD FOR MANUFACTURING LONG-RANGE RADIO FREQUENCY IDENTIFICATION PRODUCT AND STRUCTURE THEREOF

(75) Inventor: Shu-Ju Chang, Taichung (TW)

(73) Assignee: Join Yiuh Industry Co., Ltd., Taichung (TW)

( * ) Notice: Subject to any disclaimer, the term of this patent is extended or adjusted under 35 U.S.C. 154(b) by 0 days.

(21) Appl. No.: 13/337,329

(22) Filed: Dec. 27, 2011

(51) Int. Cl.
*G06K 19/06* (2006.01)

(52) U.S. Cl. .................... 235/492; 340/572.7

(58) Field of Classification Search ........... 235/492; 340/572.7, 572.8
See application file for complete search history.

(56) References Cited

U.S. PATENT DOCUMENTS

| | | | | |
|---|---|---|---|---|
| 7,443,301 B2* | 10/2008 | Tucker et al. | | 340/572.8 |
| 7,460,015 B2* | 12/2008 | Forster et al. | | 340/572.3 |
| 7,843,347 B2* | 11/2010 | Nikitin et al. | | 340/572.7 |
| 7,902,984 B2* | 3/2011 | Duron et al. | | 340/572.1 |
| 8,310,344 B2* | 11/2012 | Geiszler et al. | | 340/10.33 |
| 2009/0295645 A1* | 12/2009 | Campero et al. | | 343/700 MS |
| 2011/0068987 A1* | 3/2011 | Carr | | 343/741 |

\* cited by examiner

*Primary Examiner* — Ahshik Kim (57) ABSTRACT

Method for manufacturing a long-range RFID metallic product and structure thereof are provided so that UHF RFID skills can be smoothly applied on the various metallic products without interference. Electromagnetic waves radiated from a transmitter can be received by a metallic first antenna. With the resonance and induction generated by the resonance chamber located in the metallic first antenna and a second antenna of the electronic tag module patch, the signal generated can be transmitted to the RFID chip to achieve long-range reading and transmitting effects. Due to the breaking cutlines of the first rigid clip located on the second antenna of the electronic tag module patch, the second antenna of the electronic tag module patch is damaged when removing the electronic tag module patch from the metallic first antenna by tearing along the breaking cutlines of the first rigid clip, thereby preventing the RFID from being duplicated.

9 Claims, 9 Drawing Sheets

METHOD FOR MANUFACTURING LONG-RANGE RADIO FREQUENCY IDENTIFICATION PRODUCT AND STRUCTURE THEREOF

BACKGROUND OF THE INVENTION

1. Field of the Invention

The invention relates to a method for manufacturing a long-range radio frequency identification metallic product and a structure thereof, providing long-range reading and transmitting effects and preventing the RFID from being duplicated.

2. Description of Related Art

Radio Frequency Identification (RFID) skills have been widely applied to various fields such as industrial automation, commercial automation, traffic and transportation control management. With the increasing researches related to ultra-high-frequency (UHF) RFID systems, long-range reading and transmitting effect, high efficiency and low cost of RFID skills can be realized. Therefore, with the advantages such as non-contact, low cost, advanced anti-counterfeit and mass-production, the RFID skills has gradually replaced conventional two-dimensional bar code skills in the present markets.

In general, due to microstrip antennas themselves defectively characterized with narrow band limitation, the majority of microstrip antennas can be limitedly designed as single-frequency and narrow band responses. Taking ultra-high frequency electronic tags, which generally incorporated with printed antennas and mostly being microstrip antennas and printed dipoles, for example, due to signals transmitted from the electronic tags being easily reflected by metallic surfaces to cause signal-receiving abnormalities or even non-motions and signal reading problems, it can be appreciated that the ultra-high frequency electronic tags are actually not suitable for being used in an environment surrounded with metallic objects, such as metallic labels, automobiles, motorcycles, vehicle license plates and electric power facilities. Alternatively, the ultra-high frequency electronic tags, are majorly applied to non-metallic medium surfaces of general merchandise, commodities and books. Basically, the majority of improved electronic tag antennas used for metallic surfaces are based on the conventional electronic tag antennas and skills, such as increasing the size of the electronic tag antenna or increasing the metallic surface distance to reduce the undesired effects to the electronic tag antenna caused by the metallic reflective surfaces, or adopting the standardized slotting method to combine with the electronic tags. In the method of increasing the size of the electronic tag antenna or increasing the metallic surface distance to reduce the undesired effects to the electronic tag antenna caused by the metallic reflective surfaces, the height or distance between the electronic tag and the metallic surface shall be kept over than 2.5 mm. In this way, the reading distance of the electronic tag can be increased, but the total cost of the electronic tag is increased and the bandwidth of the antenna is reduced, and also the undesired effects to the electronic tag antenna caused by the metallic reflective surfaces still cannot be eliminated. In view of this, the conventional electronic tag antennas are almost applied for the places with non-metallic surfaces. For example, Electronic Toll Collection (ETC) in Taiwan and the designs of general identification tags. On the other hand, in the combination technique of the standardized slotting method and the electronic tags, the reliability and smoothness of the product are relatively unstable and uncontrollable, and particularly the joint points between the chip and the metallic contacts of the metallic antenna are separated from each other due to the property of thermal expansion and cold shrinkage and long-term operation. In this design, impedance matching shall be performed between each of the metallic antennas and the chip, or the frequency bias or field pattern variations are possibly occurred. In general, joint points between the chip and the metallic contacts of the metallic antenna are treated by conductive glue adhering, copper pouring, copper electroplating and vacuum copper sputtering, etc. Taking the conductive glue for example, the lift span of the conductive glue in the room temperature is about two to five years. If the conductive glue is hardened or oxidized, a certain resistance is formed in the bonding layer disposed between the hardened conductive materials and the neighboring materials in the conductive glue, and the resistance of the accumulated conductive materials in the conductive glue results in the rising of the VF value and a bulky change of the frequency bias and field pattern variation. Thus, it is difficult to control the credibility of the conductive glue with respect to lift span and temperature. The problems caused by the copper pouring method are slightly similar to that of the conductive glue adhering method. In the copper electroplating method, due to the different expansion coefficients of aluminum material and the copper material, the chip and the metallic antenna are possibly separated from each other caused by the peeling of the electroplated copper layer. In the vacuum copper sputtering method, the vacuum copper sputtering method has a stability superior to the copper electroplating method, but the operation cost is extremely high when dealing with the large-sized product with a small sputtering area. Besides, when the electronic tag is combined to the antenna by the standardized slotting method, it is usually that the connection of the electronic tag and the antenna cannot be prevented from crashing, scratching, moistening and stealing.

Ceramic dielectric microstrip antenna is applicable to metallic surfaces, capable of providing high dielectric constant to obtain a minimized antenna size and utilizing the metallic surface as an extended reflective surface to stabilize the performance and to increase directivity, but not suitable for being the economic electronic tag due to its high manufacturing cost. Alternatively, an artificial magnetic conductor (AMC) structure, characterized with high impedance to generate a magnetic-flow direction between the AMC structure and the economic electronic tag identical to that between the metallic surface and the AMC structure, can be laminated between an antenna radiation surface and the metallic surface to increase the reading range and gains of the economic electronic tag, but the AMC skills are still in experimental stage due to its difficulty and high cost.

SUMMARY OF THE INVENTION

To prevent the signals of ultra-high-frequency (UHF) RFID from being spoilt by interference from the metallic surface or parts, the invention provides a metallic plate of a metallic product to be a metallic first antenna body and constitutes a first antenna by forming a resonance chamber on the metallic first antenna body. In an electronic tag module preparation, a small-sized microstrip loop metallic second antenna provided with breaking cutlines is bonded to and sealed in the metallic first antenna so that the second antenna is matching with the metallic first antenna on the resonance chamber. With an anti-interference treatment on the surface of the metallic first antenna, an ultra-high-frequency (UHF) RFID disposed in a radio frequency identification (RFID) metallic product is capable of being normally operated without interference from the metallic surface and providing excellent converted field patterns, effectively attaining a ten-meter long-range reading and transmitting effects. Further, due to the design of the breaking cutlines on the second antenna of the electronic tag module patch, the second antenna of the electronic tag module patch is damaged and invalid when the electronic tag module patch is removed by tearing along the breaking cutlines, thereby preventing the RFID from being removed and duplicated.

An object of the invention is to provide a method for manufacturing a long-range radio frequency identification metallic product. The method of the invention at least comprises a metallic first antenna preparation, an electronic tag module patch preparation, an electronic tag mounting process, an electronic tag sealing process and an identity surface treatment process. In the metallic first antenna preparation a metallic first antenna is manufactured by a metallic first antenna body manufacturing process, a resonance chamber molding manufacturing process and a resonance chamber surface treating process. In the metallic first antenna body manufacturing process a metallic first antenna body of a predetermined shape is formed by punching on a metallic plate selected from a metallic product. In the resonance chamber molding manufacturing process two long inner slots and an outer slot are formed on one sidewall of the metallic first antenna body by punching, a geometry concave slot is formed on an intersection of the inner slots and the outer slot and having a height difference with respect to a hole-outer surface by punching or forging or machining of computer numerical control milling machine, and a rectangular recessed portion molded as a resonance chamber is formed on the intersection of the inner slots and the outer slot within the concave slot, wherein an inner surface of the concave slot located outside the rectangular recessed portion is served as a metallic ground surface for the resonance chamber. In the resonance chamber surface treating process a surface of the resonance chamber surface is treated by a ceramic processing so that an anti-interference ceramic thin film is formed on the surface of the resonance chamber. In the electronic tag module patch preparation an electronic tag module patch is formed by a substrate integrated process, an antenna allocation chip bonding process and a module packaging process, wherein in the substrate integrated process a first rigid clip made of an insulating low dielectric coefficient material and provided with a breaking cutline is bonded to a rigid thin-plate substrate made of a low dielectric coefficient material, in the antenna allocation chip bonding process a loop copper foil second antenna or inductance formed by etching and a radio frequency identification chip are attachingly bonded on the first rigid clip, and a plurality of conductive metallic wires made of gold, aluminum and copper are electrically connected between the copper foil second antenna and the radio frequency identification chip on the first rigid clip by wire bonding, and in the module packaging process a second rigid clip which is made of an insulating low dielectric coefficient material and provided with a breaking cutline corresponding to the breaking cutline of the first rigid clip is overlapped on a bottom surface of the first rigid clip so that the copper foil second antenna and the radio frequency identification chip are packaged between the first rigid clip and the second rigid clip, and a bottom surface of the second rigid clip is served as a mounting surface when the electronic tag module patch and the metallic first antenna are jointed. In the electronic tag mounting process a mounting surface of the electronic tag module patch is bonded to the resonance chamber of the metallic first antenna and jointed to the metallic ground surface within the concave slot so that the loop copper foil second antenna or inductance is matched to the metallic first antenna at the rectangular recessed portion to generate resonance and induction. In the electronic tag sealing process a colloidal filling glue, which is filled in the resonance chamber of the metallic first antenna, the outer slot of the metallic first antenna body and the concave slot attached with the electronic tag module patch by glue dripping or glue filling, is treated by baking and cooling processes in a stove so that the electronic tag module patch is sealed and bound in the metallic first antenna by the cured filling glue and the metallic first antenna is provided with a grinded and embellish glued surface. In the identity surface treatment process the metallic first antenna treated in the electronic tag sealing process being coated or sprayed on a surface thereof with an anti-interference ceramic paint and treated by baking and cooling processes in the stove so that an anti-interference surface layer is formed on the surface of the metallic first antenna. With the fulfillment of the above-described manufacturing processes, ultra-high-frequency (UHF) RFID skills can be smoothly applied on the various metallic products (e.g., vehicle license plate) without interference. Electromagnetic waves radiated from a transmitter can be received by a metallic first antenna. With the resonance and induction generated by the resonance chamber located in the metallic first antenna and the second antenna of the electronic tag module patch, the signal generated can be transmitted to the RFID chip to achieve long-range reading and transmitting effects. Due to the breaking cutlines of the first rigid clip located on the second antenna of the electronic tag module patch, the second antenna of the electronic tag module patch is damaged and invalid when the electronic tag module patch glued and sealed in the metallic first antenna is removed by tearing along the breaking cutlines of the first rigid clip, thereby preventing the RFID from being duplicated.

Another object of the invention is to provide a method for manufacturing a long-range radio frequency identification metallic product, wherein in the metallic first antenna preparation the metallic first antenna is formed by molding the resonance chamber on the metallic first antenna body in the resonance chamber molding manufacturing process, the rectangular recessed portion of the resonance chamber having a width slightly greater than that of the inner slot is downwardly recessed from a plane of the metallic ground surface within the concave slot; in the antenna allocation chip bonding process of the electronic tag module patch preparation the width of the rectangular recessed portion corresponding to the width of the inner slot of the resonance chamber is formed by etching, the rectangular recessed portion has a length is capable of exceeding a rectangular loop copper foil second antenna disposed in the rectangular recessed portion of the resonance chamber, and the loop copper foil second antenna and the radio frequency identification chip are packaged by the bonding of the second rigid clip and the first rigid clip as well as the electronic tag module patch is formed in the module packaging process after the loop copper foil second antenna is electrically connected to the radio frequency identification chip on the first rigid clip; in the electronic tag mounting process the electronic tag module patch is bonded to the metallic ground surface of the concave slot of the resonance chamber of the metallic first antenna in the manner of utilizing the loop copper foil second antenna to be located at the rectangular recessed portion with two ends thereof averagely extended in the inner slots so that the loop fold-line second antenna has an ideal field pattern matching with the metallic first antenna on the resonance chamber, thereby generating excellent resonance and induction effects.

Still another object of the invention is to provide a method for manufacturing a long-range radio frequency identification metallic product, wherein in the identity surface treatment process the anti-interference surface layer formed on the surface of the metallic first antenna is capable of being printed with characters, numbers or figures thereon, thereby achieving the identifying purpose when performing non-radio identification.

Yet another object of the invention is to provide a method for manufacturing a long-range radio frequency identification metallic product, wherein in the identity surface treatment process the surface of the metallic first antenna treated in the electronic tag sealing process is capable of being formed with concave or convex characters, numbers or figures by punching and then being coated with the anti-interference ceramic paint or colored, and thus a metallic product such as a plate or vehicle license plate having the electronic tag formed with characters, numbers or figures thereon can be obtained after baking and cooling processes.

Yet another object of the invention is to provide a long-range radio frequency identification metallic product structure. The metallic product structure comprises a metallic first antenna and an electronic tag module patch. The metallic first antenna comprises a metallic first antenna body partially or totally made of a metallic plate shape of a metallic product, the metallic first antenna body comprises one sidewall provided with a resonance chamber including a geometry concave slot which is formed on an intersection of two long inner slots and an outer slot and having a height difference with respect to a hole-outer surface and a rectangular recessed portion which is formed on the intersection of the inner slots and the outer slot within the concave slot wherein the two inner slots are parallel to the sidewall of the metallic first antenna body and the outer slot is perpendicular to the sidewall of the metallic first antenna body, an anti-interference ceramic thin film is formed on the surface of the resonance chamber, and an inner surface of the concave slot which is located outside the rectangular recessed portion to be served as a metallic ground surface for the resonance chamber. The electronic tag module patch, bonded to the metallic ground surface of the resonance chamber of the metallic first antenna and fixedly sealed and bound in the metallic first antenna by a filling glue which is formed in the resonance chamber of the metallic first antenna by glue dripping or glue filling and cured by baking, comprises a thin-plate substrate made of a low dielectric coefficient material, a first rigid clip made of an insulating low dielectric coefficient material and provided with a breaking cutline to be bonded to the thin-plate substrate, a second antenna attachingly bonded on the first rigid clip and served as a rectangular loop copper foil antenna or inductance, a radio frequency identification chip attachingly bonded on the first rigid clip and electrically connected to the second antenna, and a second rigid clip made of an insulating low dielectric coefficient material and provided with a breaking cutline corresponding to the first rigid clip, wherein the second rigid clip is bonded to the first rigid clip so that the second antenna and the radio frequency identification chip are packaged between the first rigid clip and the second rigid clip, and a bottom surface of the second rigid clip is served as a mounting surface bonded to the metallic ground surface of the resonance chamber of the metallic first antenna. With the metallic product manufactured by the above-described structure, ultra-high-frequency (UHF) RFID skills can be smoothly applied on the various metallic products (e.g., vehicle license plate) without interference. Electromagnetic waves radiated from a transmitter can be received by a metallic first antenna. With the resonance and induction generated by the resonance chamber located in the metallic first antenna and the second antenna of the electronic tag module patch, the signal generated can be transmitted to the RFID chip to achieve long-range reading and transmitting effects. Due to the breaking cutlines of the first rigid clip located on the second antenna of the electronic tag module patch, the second antenna of the electronic tag module patch is damaged and invalid when the electronic tag module patch glued and sealed in the metallic first antenna is removed by tearing along the breaking cutlines of the first rigid clip, thereby preventing the RFID from being duplicated.

Yet another object of the invention is to provide a long-range radio frequency identification metallic product structure, wherein the rectangular recessed portion of the resonance chamber of the metallic first antenna having a width slightly greater than that of the inner slot is downwardly recessed from a plane of the metallic ground surface within the concave slot, and the rectangular loop copper foil second antenna of the electronic tag module patch located at the rectangular recessed portion of the resonance chamber of the metallic first antenna has a width corresponding to the width of the inner slot of the resonance chamber and a length capable of exceeding the rectangular recessed portion of the resonance chamber and being averagely extended in the inner slots, so that the loop fold-line second antenna has an ideal field pattern matching with the metallic first antenna on the resonance chamber to generate excellent resonance and induction effects.

Yet another object of the invention is to provide a long-range radio frequency identification metallic product structure, wherein the electronic tag module patch is fixedly sealed and bound in the metallic first antenna by the cured filling glue, and the metallic first antenna has a grinded and embellish glued surface coated with an anti-interference ceramic paint which is served as an anti-interference surface layer for resisting interference. The anti-interference surface layer of the metallic first antenna is printed with characters, numbers or figures thereon, thereby achieving the identifying purpose when performing non-radio identification.

Yet another object of the invention is to provide a long-range radio frequency identification metallic product structure wherein the electronic tag module patch is fixedly bound in the metallic first antenna, the metallic first antenna has a grinded and embellish glued surface capable of being formed with concave or convex characters, numbers or figures by punching and then being coated with the anti-interference ceramic paint or colored by baking, and thus a metallic product such as a plate or vehicle license plate having the electronic tag formed with characters, numbers or figures thereon can be obtained.

The above and other objects, features and advantages of the invention will become apparent from the following detailed description taken with the accompanying drawings.

DETAILED DESCRIPTION OF THE INVENTION

Figure 1:
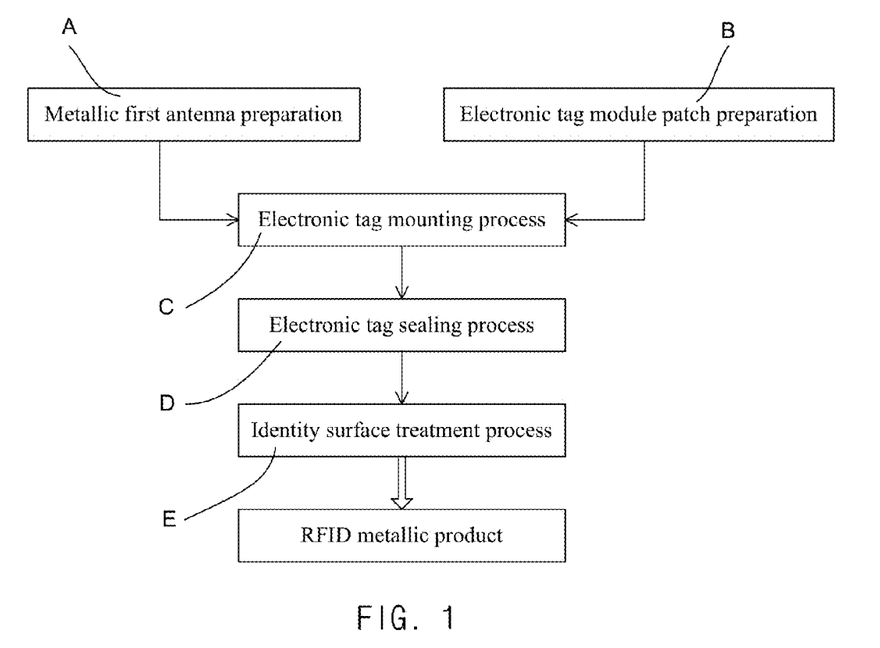
FIG. 1 is a schematic view showing the process of the invention.

Referring to FIG. 1, a method for manufacturing a long-range radio frequency identification (RFID) metallic product, at least comprising a metallic first antenna preparation, an electronic tag module patch preparation, an electronic tag mounting process, an electronic tag sealing process, and an identity surface treatment process.

Figure 2:
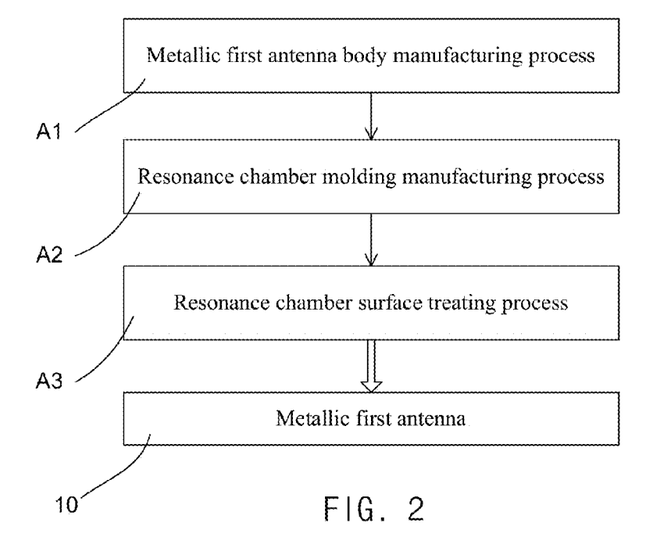
FIG. 2 is a schematic view showing the preparation flowchart of a metallic first antenna of the invention.

Referring to FIG. 2, in the metallic first antenna preparation, a metallic first antenna 10 is manufactured by a metallic first antenna body manufacturing process A1, a resonance chamber molding manufacturing process A2 and a resonance chamber surface treating process A3.

Figure 3:
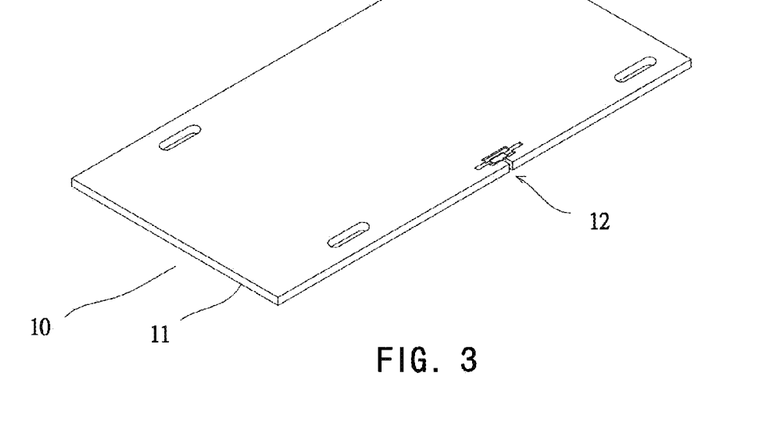
FIG. 3 is a perspective schematic view showing the structure of a metallic first antenna of the invention.

Referring to FIG. 3, in the metallic first antenna body manufacturing process, a metallic first antenna body 11 of a predetermined vehicle license plate shape is formed by punching on a metallic plate selected from a metallic product.

Figure 4:
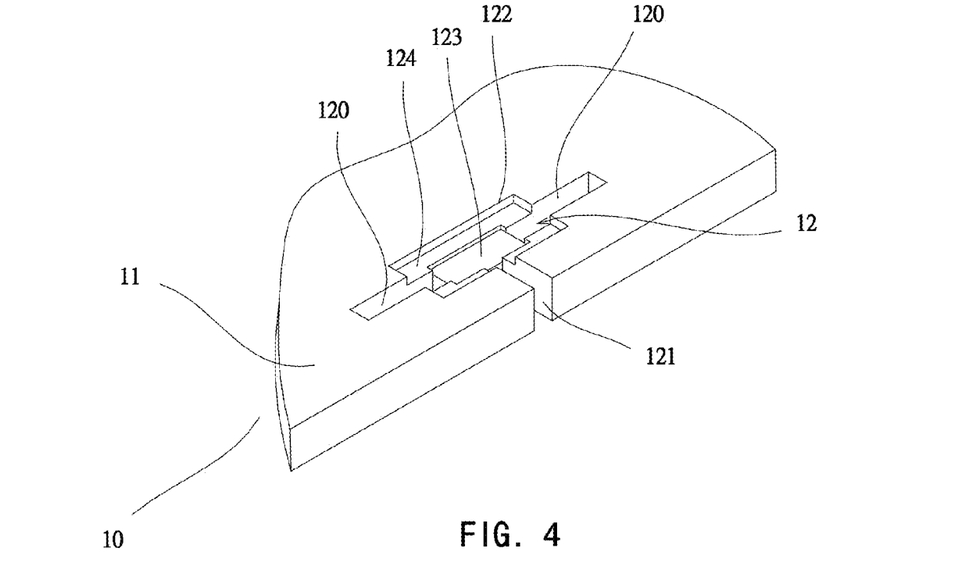
FIG. 4 is a perspective schematic view showing the structure of a resonance chamber of a metallic first antenna of the invention.
Figure 5:
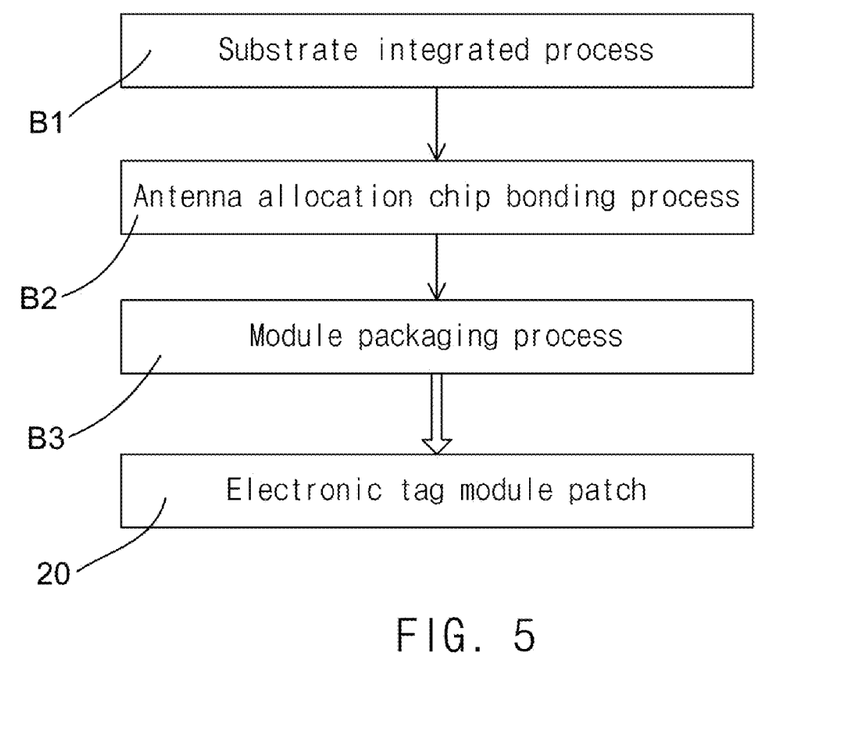
FIG. 5 is a schematic view showing the preparation flowchart of an electronic tag module patch of the invention.

Referring to FIG. 4 in conjunction with FIGS. 2, 3, in the resonance chamber molding manufacturing process A2, two long inner slots 120 and an outer slot 121 are formed on one sidewall of the metallic first antenna body 11 by punching, a geometry (rectangular) concave slot 122 is formed on an intersection of the inner slots 120 and the outer slot 121 and having a height difference with respect to a hole-outer surface by punching, forging or machining of computer numerical control (CNC) milling machine, and a rectangular recessed portion 123 molded as a resonance chamber 12 is formed on the intersection of the inner slots 120 and the outer slot 121 within the concave slot 122, wherein an inner surface of the concave slot 122 located outside the rectangular recessed portion 123 is served as a metallic ground surface 124 for the resonance chamber 12. In the resonance chamber surface treating process A3, a surface of the resonance chamber surface 12 is treated by a ceramic processing so that an anti-interference ceramic thin film is formed on the surface of the resonance chamber 12. As shown in FIGS. 1 and 5, in the electronic tag module patch preparation, an electronic tag module patch 20 is formed by a substrate integrated process B1, an antenna allocation chip bonding process B2 and a module packaging process B3.

Figure 6:
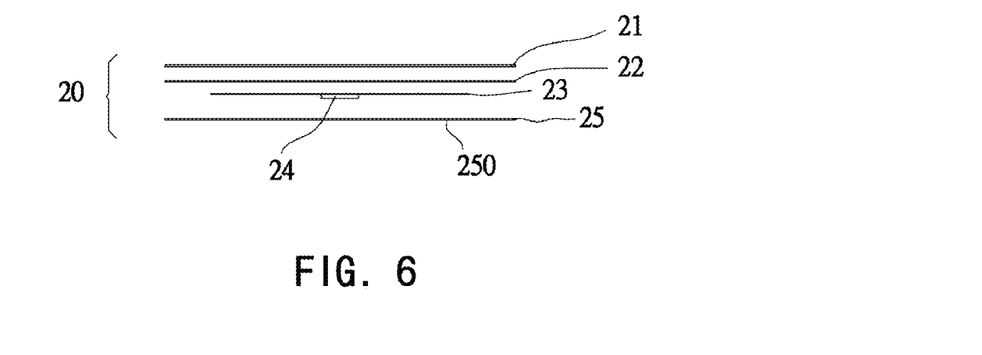
FIG. 6 is an exploded schematic view showing the package structure of an electronic tag module patch of the invention.
Figure 7:
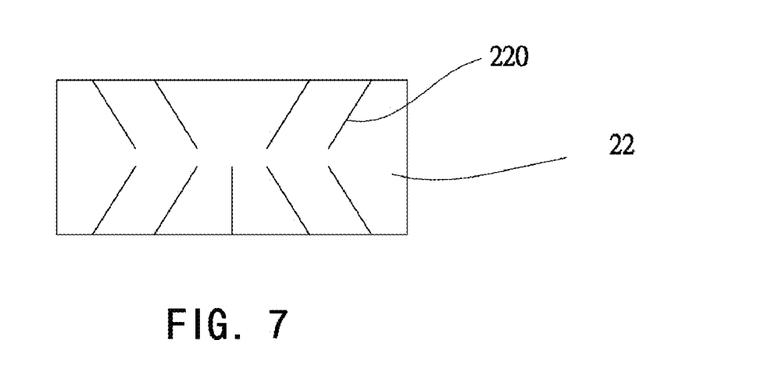
FIG. 7 is a schematic view showing the structure of a first rigid clip of an electronic tag module patch of the invention.
Figure 8:
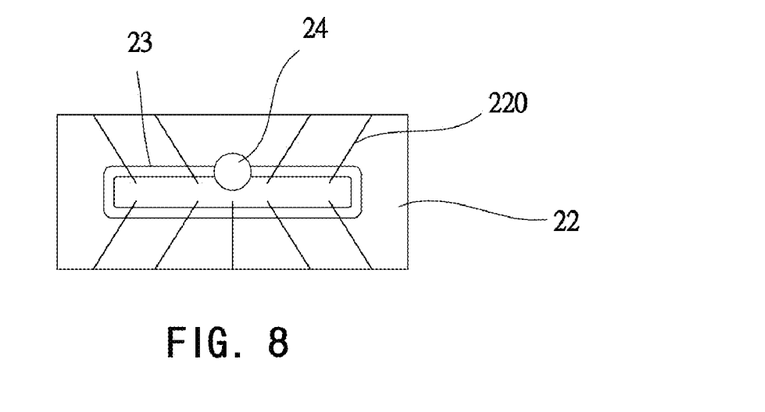
FIG. 8 is a schematic view showing the status of an electronic tag module patch of the invention, wherein a first rigid clip is attachingly bonded with an antenna and a chip.

Referring to FIGS. 5, 6 and 7, in the substrate integrated process B1, a first rigid clip 22 made of an insulating low dielectric coefficient material and provided with breaking cutlines 220 is bonded to a rigid thin-plate substrate 21 made of a low dielectric coefficient material. As shown in FIGS. 5, 6 and 8, in the antenna allocation chip bonding process B2, a loop copper foil second antenna or inductance 23 formed by etching and a radio frequency identification (RFID) chip 24 are attachingly bonded on the first rigid clip 22, and a plurality of conductive metallic wires made of gold, aluminum and copper are electrically connected between the copper foil second antenna 23 and the RFID chip 24 on the first rigid clip 22 by wire bonding.

As shown in FIGS. 5, 6 and 7, in the module packaging process B3, a second rigid clip 25, which is made of an insulating low dielectric coefficient material, provided with a breaking cutline and corresponding to the breaking cutline 220 of the first rigid clip 22, is overlapped on a bottom surface of the first rigid clip 22 so that the copper foil second antenna 23 and the RFID chip 24 are packaged between the first rigid clip 22 and the second rigid clip 25.

Figure 9:
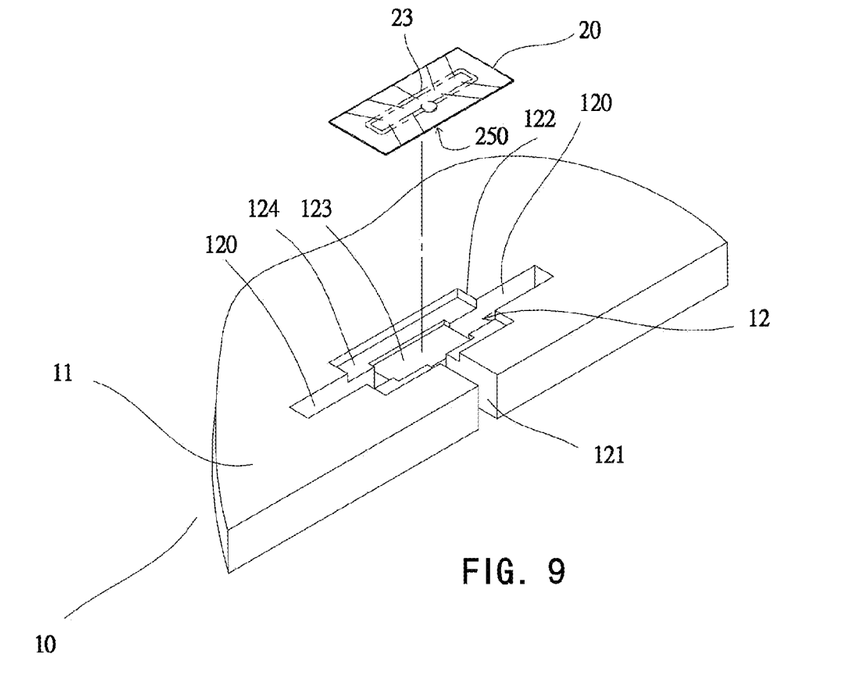
FIG. 9 is a perspective schematic view showing the bonding relationship of an electronic tag module patch and a resonance chamber of the invention.

As shown in FIGS. 6 and 9, in the electronic tag mounting process, a bottom surface of the second rigid clip 25 is served as a mounting surface 250 when the electronic tag module patch 20 and the metallic first antenna 10 are jointed. Note that the thin-plate substrate 21, the first rigid clip 22 and the second rigid clip 25 made by low dielectric coefficient plates can prevent the second antenna 23 from being affected by a large frequency deviation.

As shown in FIGS. 1 and 9, in the electronic tag mounting process, a mounting surface 250 of the electronic tag module patch 20 is bonded to the resonance chamber 12 of the metallic first antenna 10 and jointed to the metallic ground surface 124 within the concave slot 122, so that the loop copper foil second antenna or inductance 23 is matched to the metallic first antenna 10 at the rectangular recessed portion 123 to generate resonance and induction.

Figure 10:
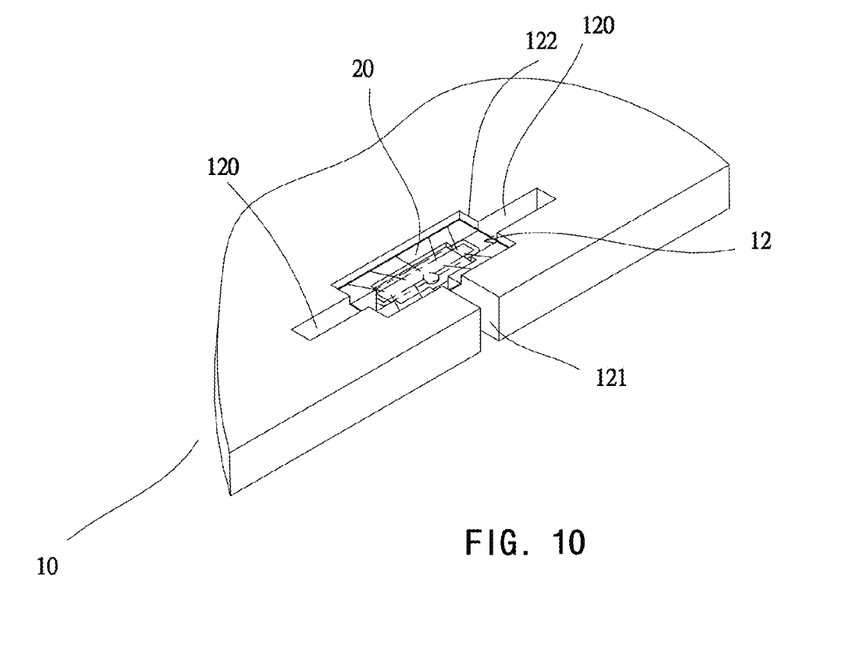
FIG. 10 is a schematic view showing the status of an electronic tag module patch bonded to a resonance chamber of the invention.
Figure 11:
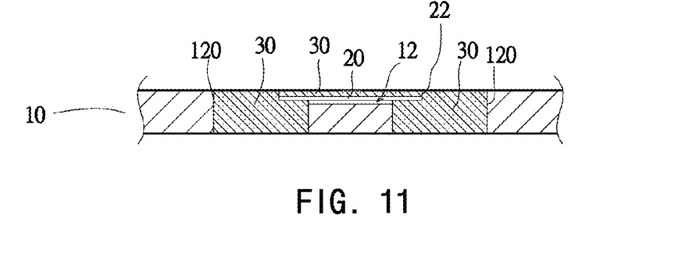
FIG. 11 is a schematic view showing the sectional structure of a packaged, attached electronic tag module patch of the invention.

As shown in FIGS. 1, 10 and 11, in the electronic tag sealing process, a colloidal filling glue 30, which is filled in the resonance chamber 12 of the metallic first antenna 10, the outer slot 121 of the metallic first antenna body 11, and the concave slot 122 attached with the electronic tag module patch 20 by glue dripping or glue filling, is treated by baking and cooling processes in a stove, so that the electronic tag module patch 20 is sealed and bound in the metallic first antenna 10 by the cured filling glue, and the metallic first antenna 10 is provided with a grinded and embellish glued surface.

Figure 12:
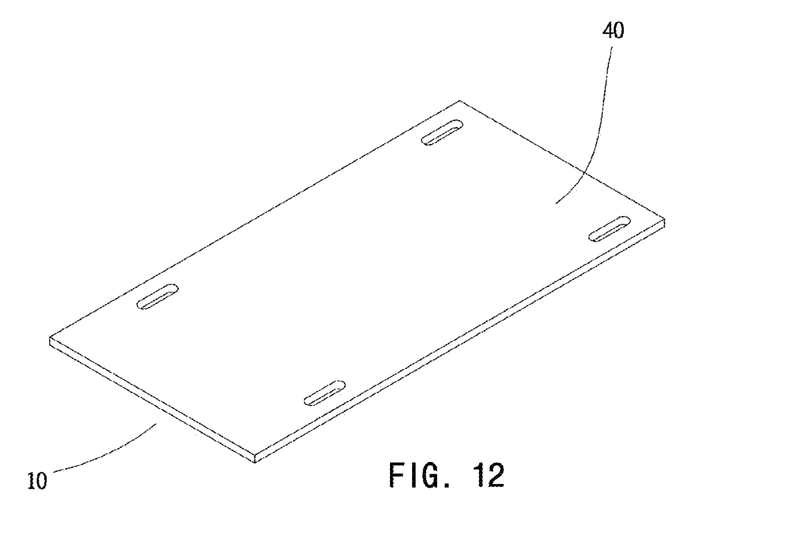
FIG. 12 shows a pattern embodiment of a completed metallic product of the invention.

As shown in FIGS. 1, 11 and 12, in the identity surface treatment process, the metallic first antenna 10 treated in the electronic tag sealing process is coated or sprayed on a surface thereof with an anti-interference ceramic paint and treated by baking and cooling processes in the stove, so that an anti-interference surface layer 40 is formed on the surface of the metallic first antenna 10. According to the above-described manufacturing processes, ultra-high-frequency (UHF) RFID skills can be smoothly applied on the various metallic products (e.g., vehicle license plates) without interference, and therefore the electromagnetic waves radiated from a transmitter can be received by the metallic first antenna 10 (e.g., metallic vehicle license plates).

Figure 13:
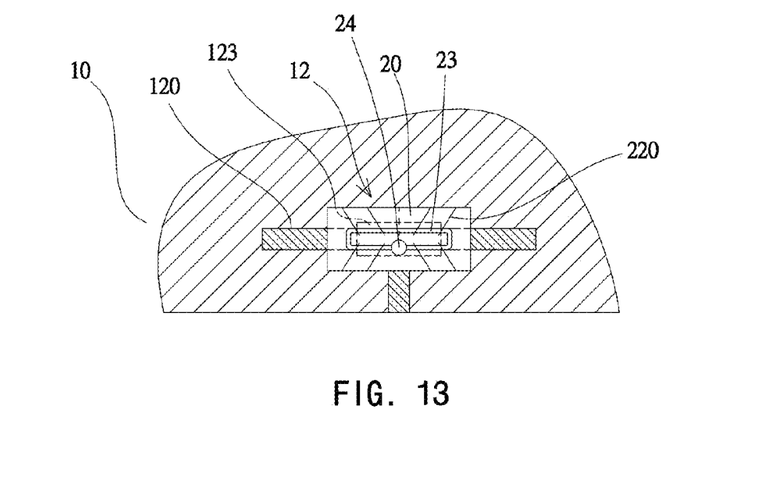
FIG. 13 is a schematic view showing the sectional structure of an electronic tag module patch sealed in a metallic first antenna and operation relationship of the invention.

As shown in FIG. 13, with the resonance and induction generated by the resonance chamber 12 located in the metallic first antenna 10 and the second antenna 23 of the electronic tag module patch 20, the signal generated can be transmitted to the RFID chip 24 so that long-range reading and transmitting effects can be achieved. Further, due to the breaking cutlines 220 of the first rigid clip 22 located on the second antenna 23 of the electronic tag module patch 20, the second antenna 23 of the electronic tag module patch 20 is damaged and invalid when the electronic tag module patch 20 glued and sealed in the metallic first antenna 10 is removed by tearing along the breaking cutlines 220 of the first rigid clip 22, thereby preventing the RFID from being duplicated.

According to the above-described method in the embodiment and as shown in FIGS. 1, 2, 3 and 4, in the metallic first antenna preparation, the metallic first antenna 10 is formed by molding the resonance chamber 12 on the metallic first antenna body 11 in the resonance chamber molding manufacturing process A2, and the rectangular recessed portion 123 of the resonance chamber 12 having a width slightly greater than that of the inner slot 120 is downwardly recessed from a plane of the metallic ground surface 124 within the concave slot 122.

As shown in FIGS. 1, 5, 6 and 13, in the antenna allocation chip bonding process 132 of the electronic tag module patch preparation, the width of the rectangular recessed portion 123 corresponding to the width of the inner slot 120 of the resonance chamber 12 is formed by etching, and the rectangular recessed portion 123 has a length capable of exceeding a rectangular loop copper foil second antenna 23 disposed in the rectangular recessed portion 123 of the resonance chamber 12.

As shown in FIG. 8, after the loop copper foil second antenna 23 is electrically connected to the RFID chip 24 on the first rigid clip 22, the loop copper foil second antenna 23 and the RFID chip 24 are packaged by the bonding of the second rigid clip 25 and the first rigid clip 22 as well as the electronic tag module patch 20 is formed in the module packaging process.

As shown in FIGS. 1, 9, 10 and 13, in the electronic tag mounting process, the electronic tag module patch 20 is bonded to the metallic ground surface 124 of the concave slot 122 of the resonance chamber 12 of the metallic first antenna 10 in the manner of utilizing the loop copper foil second antenna 23 to be located at the rectangular recessed portion 123 with two ends thereof averagely extended in the inner slots 120, so that the loop fold-line second antenna 23 has an ideal field pattern matching with the metallic first antenna on the resonance chamber 12 to generate excellent resonance and induction effects.

Figure 14:
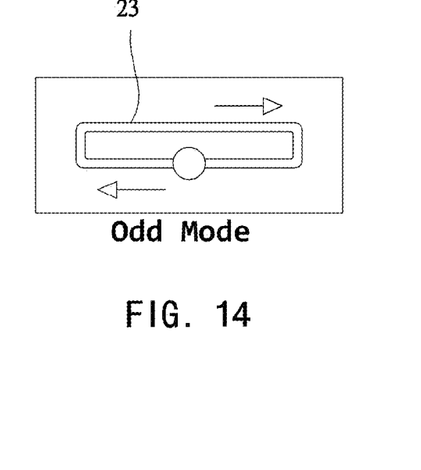
FIG. 14 is a schematic view showing a rectangular loop of a second antenna of the invention when a signal source is in an odd mode.
Figure 15:
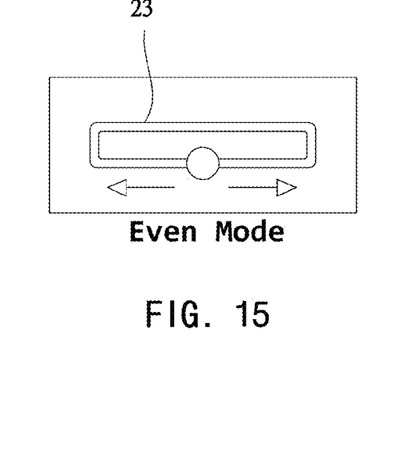
FIG. 15 is a schematic view showing a rectangular loop of a second antenna of the invention when a signal source is in an even mode.
Figure 16:
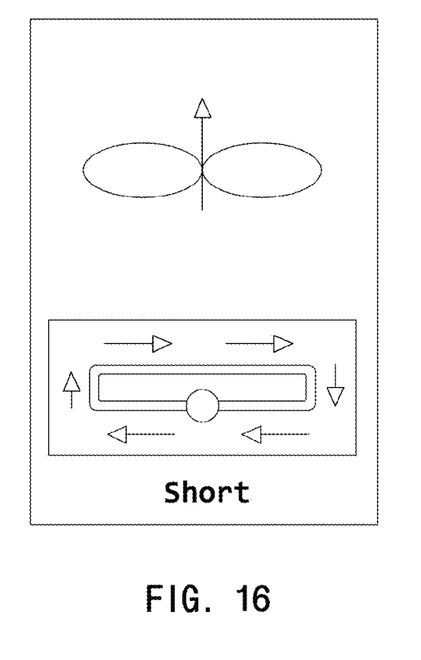
FIG. 16 is a schematic view showing an radiated field patterns of the whole second antenna of the invention when a signal source is in an odd mode.
Figure 17:
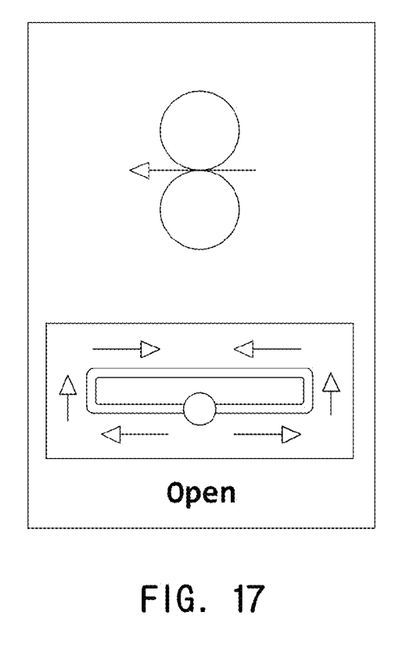
FIG. 17 is a schematic view showing a radiated field pattern of the whole second antenna of the invention when a signal source is in an even mode.

According to the method in the embodiment, the second antenna 23 bonded on the first rigid clip 22 is capable of triggering the resonance bandwidth by the loop fold-line thereof. In FIGS. 14 and 15, the second antenna 23 is a rectangular loop antenna having a length equal to a wavelength. As shown in FIGS. 16 and 17, when a signal source is in an even or odd mode, radiated field patterns of the whole second antenna 23 are linear polarizations, and the radiation direction is the difference between the radiated field patterns. A 90-degree phase difference formed between two orthogonal field patterns is the major condition for forming a circular polarization, and the same amplitude of the electric field and the symmetrical loop antenna structure result in the radiation field with linear polarization.

Figure 18:
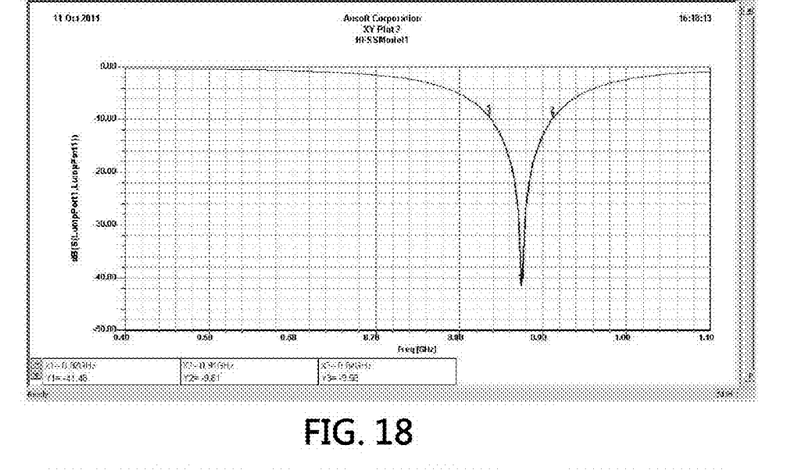
FIG. 18 is a frequency response curve of the return loss of a metallic first antenna and a second antenna of the invention, which is stimulated by HFSS simulation software.

FIG. 18 shows a frequency response curve of return loss of the metallic first antenna 10 and the second antenna 23, which is stimulated by HFSS simulation software, wherein the bandwidth is ranged from 820 to 960 MHz, and the distribution of the return loss is from −4 dB, −9.58 dB, −41.48 dB, −9.81 dB to −4 dB.

Figure 19:
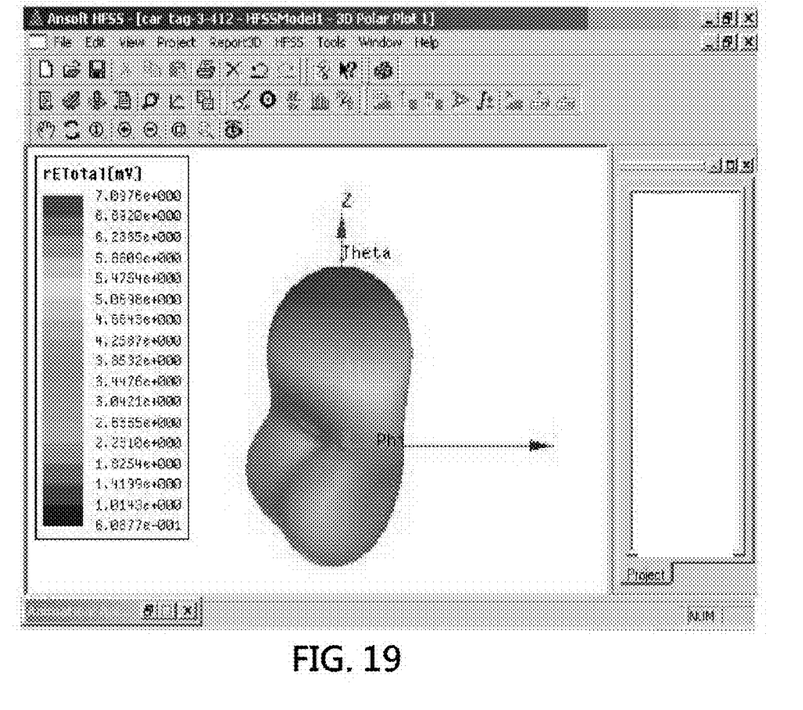
FIG. 19 is a YZ3D field pattern diagram simulated by the simulation software in FIG. 18.
Figure 20:
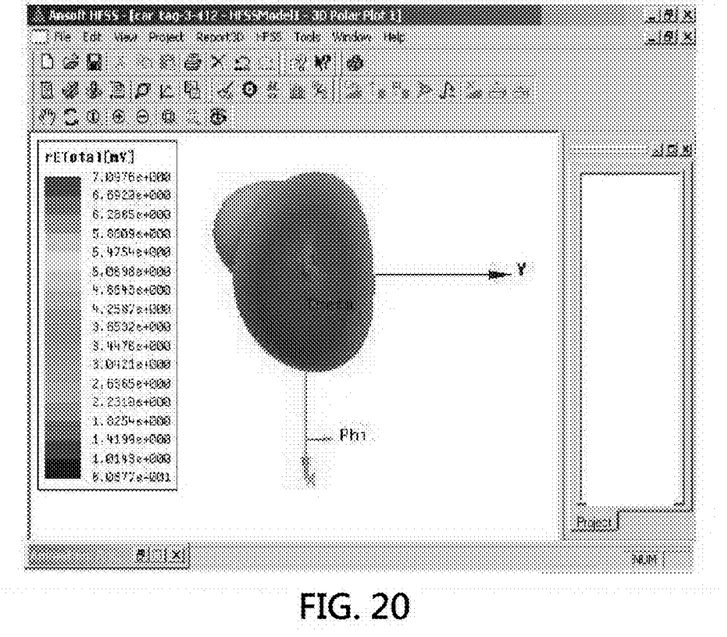
FIG. 20 is a XY3D field pattern diagram simulated by the simulation software in FIG. 18.
Figure 21:
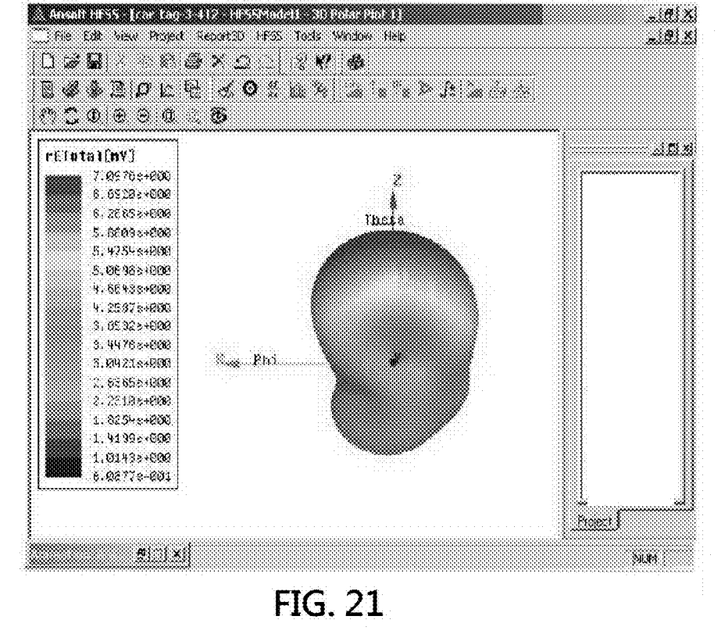
FIG. 21 is a XZ3D field pattern diagram simulated by the simulation software in FIG. 18.

FIGS. 19, 20 and 21 show YZ3D, XY3D and XZ3D field pattern diagrams simulated by the simulation software in FIG. 18.

A performance testing report of four real samples of electronic tags (vehicle license plates) manufactured by the method in the above-described embodiments is certificated by RFID Solution and Testing Center, Cheng Loong Corp. The result of the performance testing report, including the standard reading range of 8.85 meters, the reading range of 7.03 meters when the samples are shielded by water, and the reading range approximately ranged from 10.5 to 18.5 meters when the samples are tested in an environment with general space and background, proves that the manufactured RFID metallic products according to the method of the invention surely is characterized with long-range reading effects.

Additionally, for increasing appearance effects or purposes, the manufactured metallic products according to the above-described method of the embodiment can be further treated by following processes. As shown in FIGS. 1 and 12, in the identity surface treatment process, the metallic first antenna 10 is formed with an anti-interference surface layer 40 on the surface thereof capable of being printed with characters, numbers or figures (not shown) thereon, thereby achieving the identifying purpose when performing non-radio identification. Further, the surface of the metallic first antenna 10 treated in the electronic tag sealing process is capable of being formed with concave or convex characters, numbers or figures (not shown) thereon by punching and then being coated with the anti-interference ceramic paint or colored thereon, and thus a metallic product (e.g., vehicle license plate) having the electronic tag formed with characters, numbers or figures thereon can be obtained after baking and cooling processes.

Further, according to the above-described method of the embodiment, the invention provides a long-range radio frequency identification (RFID) metallic product structure. As shown in FIGS. 3, 4 and 9, the RFID metallic product structure comprises a metallic first antenna 10 and an electronic tag module patch 20. The metallic first antenna 10 comprises a metallic first antenna body 11 (e.g., a body of a vehicle license board) partially or totally served by or made of a metallic plate shape of a metallic product, and the metallic first antenna body 11 comprises one sidewall provided with a resonance chamber 12. In the metallic first antenna body 11, the resonance chamber 12 includes a geometry (rectangular) concave slot 122 which is formed on an intersection of two long inner slots 120 and an outer slot 121 and having a height difference with respect to a hole-outer surface and a rectangular recessed portion 123 which is formed on the intersection of the inner slots 120 and the outer slot 121 within the concave slot 122, wherein the two inner slots 120 are parallel to the sidewall of the metallic first antenna body 11 and the outer slot 121 is perpendicular to the sidewall of the metallic first antenna body 11, an anti-interference ceramic thin film is formed on the surface of the resonance chamber, and an inner surface of the concave slot which is located outside the rectangular recessed portion 123 is served as a metallic ground surface 124 for the resonance chamber 12.

As shown in FIGS. 9, 10 and 11, an electronic tag module patch 20 is bonded to the metallic ground surface 124 of the resonance chamber 12 of the metallic first antenna 10 and fixedly sealed and bound in the metallic first antenna 10 by a filling glue, wherein the filling glue is formed in the resonance chamber 12 of the metallic first antenna 10 by glue dripping or glue filling and cured by baking. As shown in FIG. 6, the electronic tag module patch 20 comprises a thin-plate substrate 21, a first rigid clip 22, a second antenna 23, a radio frequency identification (RFID) chip 24 and a second rigid clip 25. As shown in FIGS. 6 and 7, the thin-plate substrate 21 is a thin sheet made of a low dielectric coefficient material. As shown in FIGS. 6 and 8, the first rigid clip 22, made of an insulating low dielectric coefficient material and provided with breaking cutlines 220, is bonded to the thin-plate substrate 21. The second antenna 23 attachingly bonded on the first rigid clip 22 is served as a rectangular loop copper foil antenna or inductance. The RFID chip 24 attachingly bonded on the first rigid clip 22 is electrically connected to the second antenna 23. The second rigid clip 25, made of an insulating low dielectric coefficient material and provided with breaking cutline (not shown) corresponding to the first rigid clip 22, is bonded to the first rigid clip 22 so that the second antenna 23 and the RFID chip 24 are packaged between the first rigid clip 22 and the second rigid clip 25.

Referring to FIG. 9 again, a bottom surface of the second rigid clip 25 is served as a mounting surface bonded to the metallic ground surface 124 of the resonance chamber 12 of the metallic first antenna 10. As shown in FIG. 12, by providing the metallic product (e.g., vehicle license plates) formed by the above-described structure, ultra-high-frequency (UHF) RFID skills can be smoothly applied on the various metallic products (e.g., vehicle license plates) without interference. As shown in FIGS. 11 and 13, with the electromagnetic waves radiated from a transmitter to be received by the metallic first antenna 10 and with the resonance and induction generated by the resonance chamber 12 located in the metallic first antenna 10 and the second antenna 23 of the electronic tag module patch 20, the signal generated can be transmitted to the RFID chip 24 so that long-range reading and transmitting effects can be achieved. Further, due to the breaking cutlines 220 of the first rigid clip 22 located on the second antenna 23 of the electronic tag module patch 20, the second antenna 23 of the electronic tag module patch 20 is damaged and invalid when the electronic tag module patch 20 glued and sealed in the metallic first antenna 10 is removed by tearing along the breaking cutlines 220 of the first rigid clip 22, thereby preventing the RFID of the metallic product (e.g., vehicle license plates) from being duplicated.

According to the above-described embodiment and as shown in FIGS. 3 and 4, in the metallic first antenna 10, the rectangular recessed portion 123 of the resonance chamber 12 having a width slightly greater than that of the inner slot 120 is downwardly recessed from a plane of the metallic ground surface 124 within the concave slot 122. As shown in FIG. 13, the rectangular loop copper foil second antenna 23 of the electronic tag module patch 20 is located on the rectangular recessed portion 123 of the resonance chamber 12, the width of the rectangular recessed portion 123 is corresponded to the width of the inner slot 120 of the resonance chamber 12, and the rectangular recessed portion 123 has a length exceeding a rectangular loop copper foil second antenna 23 disposed in the rectangular recessed portion 123 of the resonance chamber 12 and two ends averagely extended in the inner slots 120. The loop fold-line second antenna 23 has an ideal field pattern matching with the metallic first antenna on the resonance chamber 12, thereby generating excellent resonance and induction effects.

According to the above-described embodiment and as shown in FIGS. 11 and 12, the electronic tag module patch 20 is fixedly sealed and bound in the metallic first antenna 10 by the cured filling glue, the metallic first antenna 10 has a grinded and embellish glued surface coated with an anti-interference ceramic paint which is served as an anti-interference surface layer 40 for resisting interference, and the anti-interference surface layer 40 of the metallic first antenna 10 is printed with characters, numbers or figures (not shown) thereon, thereby achieving the identifying purpose when performing non-radio identification.

According to the above-described embodiment and as shown in FIGS. 11 and 12, the electronic tag module patch 20 is fixedly bound in the metallic first antenna 10, and the metallic first antenna 10 has a grinded and embellish glued surface capable of being formed with concave or convex characters, numbers or figures (not shown) by punching and then being coated with the anti-interference ceramic paint (to form the anti-interference surface layer 40) or colored by baking, and thus a metallic product (e.g., vehicle license plate) having the electronic tag formed with characters, numbers or figures thereon can be obtained after baking and cooling processes.

While the invention has been described in terms of preferred embodiments, those skilled in the art will recognize that the invention can be practiced with modifications within the spirit and scope of the appended claims.

What is claimed is:

1. A method for manufacturing a long-range radio frequency identification metallic product, comprising the steps of:

a metallic first antenna preparation, an electronic tag module patch preparation, an electronic tag mounting process, an electronic tag sealing process and an identity surface treatment process;

in the metallic first antenna preparation a metallic first antenna being manufactured by a metallic first antenna body manufacturing process, a resonance chamber molding manufacturing process and a resonance chamber surface treating process;

in the metallic first antenna body manufacturing process a metallic first antenna body of a predetermined shape being formed by punching on a metallic plate selected from a metallic product;

in the resonance chamber molding manufacturing process two long inner slots and an outer slot being formed on one sidewall of the metallic first antenna body by punching, a geometry concave slot being formed on an intersection of the inner slots and the outer slot and having a height difference with respect to a hole-outer surface by punching or forging or machining of computer numerical control milling machine, and a rectangular recessed portion molded as a resonance chamber being formed on the intersection of the inner slots and the outer slot within the concave slot, wherein an inner surface of the concave slot located outside the rectangular recessed portion is served as a metallic ground surface for the resonance chamber;

in the resonance chamber surface treating process a surface of the resonance chamber surface being treated by a ceramic processing so that an anti-interference ceramic thin film is formed on the surface of the resonance chamber;

in the electronic tag module patch preparation an electronic tag module patch being formed by a substrate integrated process, an antenna allocation chip bonding process and a module packaging process, wherein in the substrate integrated process a first rigid clip made of an insulating low dielectric coefficient material and provided with a breaking cutline is bonded to a rigid thin-plate substrate made of a low dielectric coefficient material, in the antenna allocation chip bonding process a loop copper foil second antenna or inductance formed by etching and a radio frequency identification chip are attachingly bonded on the first rigid clip, and a plurality of conductive metallic wires made of gold, aluminum and copper are electrically connected between the copper foil second antenna and the radio frequency identification chip on the first rigid clip by wire bonding, and in the module packaging process a second rigid clip which is made of an insulating low dielectric coefficient material and provided with a breaking cutline corresponding to the breaking cutline of the first rigid clip is overlapped on a bottom surface of the first rigid clip so that the copper foil second antenna and the radio frequency identification chip are packaged between the first rigid clip and the second rigid clip, and a bottom surface of the second rigid clip is served as a mounting surface when the electronic tag module patch and the metallic first antenna are jointed;

in the electronic tag mounting process a mounting surface of the electronic tag module patch being bonded to the resonance chamber of the metallic first antenna and jointed to the metallic ground surface within the concave slot so that the loop copper foil second antenna or inductance is matched to the metallic first antenna at the rectangular recessed portion to generate resonance and induction;

in the electronic tag sealing process a colloidal filling glue, which is filled in the resonance chamber of the metallic first antenna, the outer slot of the metallic first antenna body and the concave slot attached with the electronic tag module patch by glue dripping or glue filling, is treated by baking and cooling processes in a stove so that the electronic tag module patch is sealed and bound in the metallic first antenna by the cured filling glue and the metallic first antenna is provided with a grinded and embellish glued surface; and in the identity surface treatment process the metallic first antenna treated in the electronic tag sealing process being coated or sprayed on a surface thereof with an anti-interference ceramic paint and treated by baking and cooling processes in the stove so that an anti-interference surface layer is formed on the surface of the metallic first antenna.

2. The method for manufacturing a long-range radio frequency identification metallic product as claimed in claim 1, wherein in the metallic first antenna preparation the metallic first antenna is formed by molding the resonance chamber on the metallic first antenna body in the resonance chamber molding manufacturing process, the rectangular recessed portion of the resonance chamber having a width slightly greater than that of the inner slot is downwardly recessed from a plane of the metallic ground surface within the concave slot;

in the antenna allocation chip bonding process of the electronic tag module patch preparation the width of the rectangular recessed portion corresponding to the width of the inner slot of the resonance chamber is formed by etching, the rectangular recessed portion has a length is capable of exceeding a rectangular loop copper foil second antenna disposed in the rectangular recessed portion of the resonance chamber, and the loop copper foil second antenna and the radio frequency identification chip are packaged by the bonding of the second rigid clip and the first rigid clip as well as the electronic tag module patch is formed in the module packaging process after the loop copper foil second antenna is electrically connected to the radio frequency identification chip on the first rigid clip; and in the electronic tag mounting process the electronic tag module patch is bonded to the metallic ground surface of the concave slot of the resonance chamber of the metallic first antenna in the manner of utilizing the loop copper foil second antenna to be located at the rectangular recessed portion with two ends thereof averagely extended in the inner slots so that the loop fold-line second antenna has an ideal field pattern matching with the metallic first antenna on the resonance chamber.

3. The method for manufacturing a long-range radio frequency identification metallic product as claimed in claim 1, wherein in the identity surface treatment process the anti-interference surface layer formed on the surface of the metallic first antenna is capable of being printed with characters, numbers or figures thereon.

4. The method for manufacturing a long-range radio frequency identification metallic product as claimed in claim 1, wherein in the identity surface treatment process the surface of the metallic first antenna treated in the electronic tag sealing process is capable of being formed with concave or convex characters, numbers or figures by punching and then being coated with the anti-interference ceramic paint or colored.

5. A long-range radio frequency identification metallic product structure, comprising:

a metallic first antenna, comprising a metallic first antenna body partially or totally made of a metallic plate shape of a metallic product, the metallic first antenna body comprising one sidewall provided with a resonance chamber including a geometry concave slot which is formed on an intersection of two long inner slots and an outer slot and having a height difference with respect to a hole-outer surface and a rectangular recessed portion which is formed on the intersection of the inner slots and the outer slot within the concave slot wherein the two inner slots are parallel to the sidewall of the metallic first antenna body and the outer slot is perpendicular to the sidewall of the metallic first antenna body, an anti-interference ceramic thin film being formed on the surface of the resonance chamber, and an inner surface of the concave slot which is located outside the rectangular recessed portion to be served as a metallic ground surface for the resonance chamber; and an electronic tag module patch bonded to the metallic ground surface of the resonance chamber of the metallic first antenna and fixedly sealed and bound in the metallic first antenna by a filling glue which is formed in the resonance chamber of the metallic first antenna by glue dripping or glue filling and cured by baking, comprising a thin-plate substrate made of a low dielectric coefficient material, a first rigid clip made of an insulating low dielectric coefficient material and provided with a breaking cutline to be bonded to the thin-plate substrate, a second antenna attachingly bonded on the first rigid clip and served as a rectangular loop copper foil antenna or inductance, a radio frequency identification chip attachingly bonded on the first rigid clip and electrically connected to the second antenna, and a second rigid clip made of an insulating low dielectric coefficient material and provided with a breaking cutline corresponding to the first rigid clip, wherein the second rigid clip is bonded to the first rigid clip so that the second antenna and the radio frequency identification chip are packaged between the first rigid clip and the second rigid clip, and a bottom surface of the second rigid clip is served as a mounting surface bonded to the metallic ground surface of the resonance chamber of the metallic first antenna.

6. The long-range radio frequency identification metallic product structure as claimed in claim 5, wherein the rectangular recessed portion of the resonance chamber of the metallic first antenna having a width slightly greater than that of the inner slot is downwardly recessed from a plane of the metallic ground surface within the concave slot, and the rectangular loop copper foil second antenna of the electronic tag module patch located at the rectangular recessed portion of the resonance chamber of the metallic first antenna has a width corresponding to the width of the inner slot of the resonance chamber and a length capable of exceeding the rectangular recessed portion of the resonance chamber and being averagely extended in the inner slots.

7. The long-range radio frequency identification metallic product structure as claimed in claim 5, wherein the electronic tag module patch is fixedly sealed and bound in the metallic first antenna by the cured filling glue, and the metallic first antenna has a grinded and embellish glued surface coated with an anti-interference ceramic paint which is served as an anti-interference surface layer for resisting interference.

8. The long-range radio frequency identification metallic product structure as claimed in claim 7, wherein the anti-interference surface layer of the metallic first antenna is printed with characters, numbers or figures thereon.

9. The long-range radio frequency identification metallic product structure as claimed in claim 5, wherein the electronic tag module patch is fixedly bound in the metallic first antenna, and the metallic first antenna has a grinded and embellish glued surface capable of being formed with concave or convex characters, numbers or figures by punching and then being coated with the anti-interference ceramic paint or colored by baking.

\* \* \* \* \*